(12) United States Patent
Tarabishi

(10) Patent No.: US 8,413,442 B2
(45) Date of Patent: Apr. 9, 2013

(54) SYSTEM FOR SUSTAINING AND STORING GREEN SOLAR ENERGY

(76) Inventor: Hisham Tarabishi, Upper St. Clair, PA (US)

( * ) Notice: Subject to any disclaimer, the term of this patent is extended or adjusted under 35 U.S.C. 154(b) by 292 days.

(21) Appl. No.: 12/889,570

(22) Filed: Sep. 24, 2010

(65) Prior Publication Data
US 2012/0042652 A1 Feb. 23, 2012

Related U.S. Application Data

(60) Provisional application No. 61/401,666, filed on Aug. 17, 2010.

(51) Int. Cl.
*F03G 6/00* (2006.01)
*F03G 7/00* (2006.01)
*F24J 2/38* (2006.01)

(52) U.S. Cl.
USPC ........................................ 60/641.15; 126/607

(58) Field of Classification Search ..... 60/641.8–641.15
See application file for complete search history.

(56) References Cited

U.S. PATENT DOCUMENTS

| | | |
|---|---|---|
| 3,988,166 A | 10/1976 | Beam |
| 4,038,971 A | 8/1977 | Bezborodko |
| 4,047,517 A | 9/1977 | Arnberg |
| 4,091,622 A | 5/1978 | Marchesi |
| 4,127,453 A | 11/1978 | Radebold |
| 4,135,493 A | 1/1979 | Kennedy |
| 4,159,708 A | 7/1979 | Pyle |
| 4,286,581 A | 9/1981 | Atkinson, Jr. |
| 4,297,000 A | 10/1981 | Fries |
| 4,317,031 A | 2/1982 | Findell |
| 4,397,152 A * | 8/1983 | Smith ........................ 60/641.15 |
| 5,275,149 A | 1/1994 | Ludlow |
| 5,421,322 A * | 6/1995 | Karni et al. ................... 126/680 |
| 6,059,016 A | 5/2000 | Rafalovich et al. |
| 6,062,029 A | 5/2000 | Doe |
| 6,128,135 A | 10/2000 | Stiles et al. |

(Continued)

FOREIGN PATENT DOCUMENTS

| | | |
|---|---|---|
| JP | 2007524055 A | 8/2007 |
| KR | 1020040086031 A | 10/2004 |
| KR | 1020100028712 A | 3/2010 |

OTHER PUBLICATIONS

"Principles of Solar Thermal Conversion"; 8 pages.

(Continued)

*Primary Examiner* — Thomas Denion
*Assistant Examiner* — Brian Inacay
(74) *Attorney, Agent, or Firm* — The Webb Law Firm

(57) ABSTRACT

An economical, highly efficient, and complete system for harnessing the sun's energy, storing, and/or converting this energy into a usable energy product on a sustainable cycle. The system includes an enclosed volume chamber having a mirrored inner surface and an opening for receiving a condensed high-temperature solar energy beam and trapping thermal energy. A fluid source is injected into the chamber for converting this energy into a high pressure source which can be fed to an energy converting device. The enclosed volume chamber can include a thermal absorbing member to store thermal energy for use during sunless hours. A sustainable system including a plurality of interconnected chambers can be provided to form an additive system of thermal energy for use during the day and during sunless hours. The thermal energy can be converted to provide a clean energy source at zero carbon emission for use in numerous and diverse applications.

26 Claims, 9 Drawing Sheets

U.S. PATENT DOCUMENTS

| | | | |
|---|---|---|---|
| 6,360,542 B1 | 3/2002 | Luo | |
| 6,691,701 B1 | 2/2004 | Roth | |
| 6,775,982 B1 * | 8/2004 | Kitamura et al. | 60/641.8 |
| 6,818,818 B2 * | 11/2004 | Bareis | 136/246 |
| 7,246,492 B2 | 7/2007 | Hendrix et al. | |
| 7,284,372 B2 | 10/2007 | Crow | |
| 7,331,178 B2 | 2/2008 | Goldman | |
| 7,340,899 B1 | 3/2008 | Rubak et al. | |
| 7,975,685 B2 | 7/2011 | Zhao | |
| 2007/0137640 A1 * | 6/2007 | Tarabishi | 126/577 |

OTHER PUBLICATIONS

Begley; "We Can't Get There From Here"; The Daily Beast; http://www.newsweekdailybeastreprints.com; 2 pages.

"Building the Green-Collar Economy"; Discover; Sep. 2011; pp. 54-61.

"Thermal Systems—Solar Stirling"; Sep. 20, 2010; 6 pages.

Nimitz; "Plasma Power Plants"; Halfbakery; 19 pages.

* cited by examiner

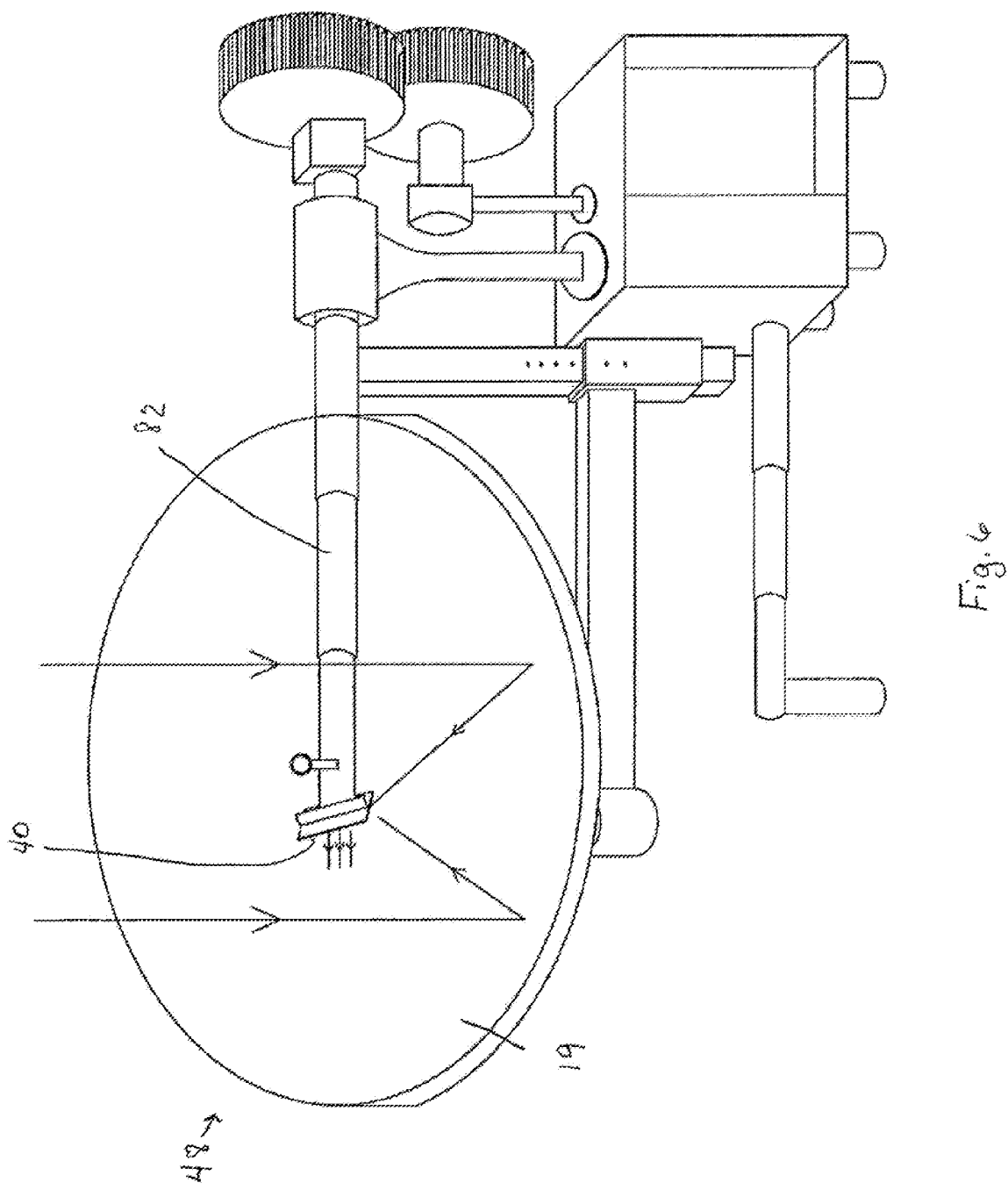

SYSTEM FOR SUSTAINING AND STORING GREEN SOLAR ENERGY

CROSS-REFERENCE TO RELATED APPLICATION

This application claims priority from U.S. Provisional Patent Application No. 61/401,666, filed Aug. 18, 2010, which is incorporated herein by reference.

BACKGROUND OF THE INVENTION

1. Field of the Invention

The invention relates generally to an apparatus for converting solar energy into a usable energy product and, more particularly, to an economical system for harnessing the sun's energy, storing this energy and/or converting this energy into a mechanical and/or electrical energy product on a sustainable cycle.

2. Description of Related Art

Solar energy has been available as a source of power for more than 4.5 billion years. For centuries, inventors have been devising various means to harness this energy. As far back as the third century B.C., records indicate that the Greek and Roman armies used "burning mirrors" to focus sunlight as weapons of war to ignite fires and to burn sails of enemy warships.

Solar energy provides the world either directly or indirectly with the majority of its energy. Solar energy is a renewable energy source having vast potential. Although solar energy is abundant, a major drawback is that it is diffuse and not available at all hours. Solar energy can be affected by the time of the day, the seasons, and the changing sun path in the sky as the earth's axis is not at a right angle to the sun but it is tilted away at an angle of 23.5°.

For decades, inventors have tried various systems for harnessing this incredible energy source. For example, U.S. Pat. Nos. 3,988,166; 4,286,581; 5,275,149 and 4,038,971 have sought to control and convert this energy into a cost-effective usable form. Unfortunately, these systems are cumbersome, expensive to manufacture and maintain, expensive to operate and yield little in terms of usable, convertible energy.

The article entitled "Principles of Solar Thermal Conversion" by R. H. B. Exell, 2000. King Mongkut's University of Technology Thonburi also discusses academic interest only, of trapping solar radiation in an enclosed volume with perfectly reflecting walls at the temperature of the sun, i.e., approximately 5800K and the need for a parabolic concentrator that focuses direct solar radiation into the enclosed volume. The article further discusses that if solar energy were to be used on a large scale, since solar energy is theoretically a very high temperature resource, one should try to harness it at this very high temperature for efficient conversion and then use the waste heat for low temperature purposes instead of downgrading the solar energy with low temperature collectors at the start. This article recites a theory for what is desired in this technology, but provides no direction as to how it can be achieved.

U.S. Pat. No. 7,640,931 to Tarabishi (hereinafter, "the '931 patent"), the entirety thereof being incorporated by reference thereto, is directed to a solar collecting system which can concentrate or condense solar energy at a fixed, stationary focal point to economically harness the sun's energy into a manageable and convertible form as desired in the Exell article. In particular, the '931 patent teaches a system for tracking the sun and maintaining a constant fixed focal point or sub-focal point to at least partially condense the sun's rays into a high-energy beam that can be redirected to a predetermined location for generating electrical power, heat energy, steam, and the like.

PVC panels currently in use are costly, have low efficiency, and only work while the sun is shining Even if a large cloud passes over the PVC field for only a few minutes, a significant megawatt loss of power can occur.

The Solar Stirling system consists of a series of mirrors in the form of a collector panel that concentrates the sunlight at a focal point which is moving in space following the east-west movement of the collector panel. A piston generator is also mounted/suspended in space in relation to the collector panel. However, due to its location in space, it is limited in size and thus has limited power output, along the lines of around 24 KW. This system is inefficient, i.e., around 25-30%, and is unable to convert a high amount of energy because the focal point is not stationary and the generator is only able to process a small amount of the condensed solar energy received.

However, as acknowledged by the Exell article, and as discussed above, a need still exists for capturing, converting and storing this solar energy in a sustainable format so that a constant energy supply is available. Current thermal energy storage systems are weak and not able to meet the significant demand during sunless hours. Storing thermal energy is a crucial issue in achieving sustainable energy. The cost related to commercially large scale electric power generation from the sun as the source, and the subsequent need for transmission, are prohibitive and limited. Leading existing solar collecting companies require a large amount of land to install a huge number of mirror arrays, thousands of PVC panels, or sun catcher systems. All of these systems require thousands of acres to achieve a meaningful industrial electric power output and have a low efficiency, between about 15-30% conversion of the energy received.

The present invention provides a low cost alternative solar energy conversion in regard to the conversion systems currently in use, is highly efficient in that it achieves almost 100% conversion of the solar energy into a usable format, and provides a sustainable storage and energy supply. The efficiency of the present invention can also be increased through the use of multiple integrated units. Further still, the system of the present invention is essentially pollution-free, leaving an essentially zero carbon footprint. Additionally, the system of the present invention is compact in size compared to the systems currently in use and, consequently, can be assembled at almost any location, i.e., inland, shoreland, and the like, as less land is used and it eliminates the need for devices to transmit the energy, such as cables and the like, to a separate location for conversion into a usable energy product. Also, the system of the present invention can generate a sustainable high power output during both sunny hours and sunless hours due to its unique, yet simple design and its inherent features and benefits.

SUMMARY OF THE INVENTION

According to a first aspect, the invention is directed to an apparatus for converting solar energy into a usable energy product, such as a mechanical or electrical energy product, wherein the apparatus comprises an enclosed volume chamber having a mirrored inner surface and an opening extending through a wall of the chamber for admitting a condensed high-temperature solar energy beam into the chamber. The mirrored inner surface functions like a thermos to at least temporarily trap heat therein created by the solar energy beam. At least a first fluid source is provided for feeding a first fluid into the chamber, wherein upon contact with the fluid, the trapped solar energy is converted into a high pressure, high thermal source. An outlet is provided for allowing the high pressure source to exit the chamber. A converting device is associated with the outlet for converting the high pressure, high thermal source into the mechanical energy product. According to one embodiment, the converting device can comprise at least a first turbine associated with the outlet for receiving the high pressure source. This turbine can be a one stage or multiple stage turbine connected to a generator for converting said high pressure source into electrical energy. A plurality of turbines and/or a series of turbines can be associated with the outlet for receiving high pressure sources from the enclosed volume chamber. A second fluid source can be provided for feeding a second fluid into the first turbine such that any remaining thermal energy contained therein is converted into superheated steam or superheated air which can be subsequently fed to a second turbine or to another chamber of the first turbine to produce more energy. Additionally, the exhaust emitted from any of the turbines can be rich enough in thermal energy to power a second turbine. According to another embodiment, the converting device can comprise a steam engine associated with the outlet for receiving the high pressure source.

A pressure valve can be located between the outlet and the turbine and a control member can be provided for controlling opening and closing of the valve based upon a predetermined amount of pressure located within the chamber. According to one embodiment, the fluid can comprise water, such as distilled water, and the high pressure source can comprise superheated steam. According to another embodiment, the fluid can comprise air, such as compressed ambient air, and the high pressure source can comprise superheated air.

The opening into the enclosed volume chamber can comprise a one-way mirror. Also, the enclosed volume chamber is capable of trapping solar energy such that the heat trapped within the chamber reaches a temperature which is at a plasma level, which can exceed 4000° C., depending upon the size of the minor and how long the solar energy is trapped in the chamber and the continuation of solar energy inputted into the chamber.

The condensed high-temperature solar energy beam can be supplied from a solar collecting system comprising a parabolic solar collector panel configured for reflecting solar rays to either a fixed focal point or a fixed sub-focal point to at least partially condense the rays and at least one deflecting mirror mounted at one of the focal point and sub-focal point for receiving the condensed rays and redirecting the rays as a condensed high-temperature solar energy beam to the enclosed volume chamber. The solar energy beam can be deflected directly into the enclosed volume chamber from the deflecting mirror or it can be delivered by a cable, such as a fiber-optic cable, or a cable having lumen having an inside wall which is lined with highly reflective material, and/or any other well-known device for delivering the condensed high-temperature solar energy beam.

The enclosed volume chamber can include one or more inlet ports and heat energy can be supplied therein from an energy storing device, such as a solar powered heat absorbing/storing receiver, for sustaining a predetermined level of heat energy in the enclosed volume device during times when the sun is unavailable.

According to another aspect, the invention is directed to an apparatus for storing and/or converting solar energy into a usable energy product, such as a mechanical or electrical energy product. The apparatus comprises an enclosed volume chamber having a mirrored inside surface. A heat absorbing member is located within the chamber and is capable of absorbing and storing at least a portion of the solar energy. An opening extends through a wall of the chamber for allowing a condensed solar energy beam to enter into the chamber. A source for feeding air into the chamber is provided such that upon contact with the solar heated heat-absorbing member, this air becomes heated and is converted into a high pressure air source. An outlet is provided for allowing the high pressure air source to exit the chamber and a pressure valve is provided for cooperating with the outlet for opening and closing based upon a predetermined amount of pressure located within the chamber. According to one embodiment, the high pressure air source is capable of being fed to a turbine connected to a generator for converting the high pressure, high thermal source into electrical energy. The stored thermal energy is capable of being fed to a second enclosed volume chamber to enable this second enclosed volume chamber to increase and/or maintain a predetermined level of heat energy therein.

The outer surface of the chamber can be formed from a poorly-conductive, insulated high pressure sustainable material. The heat absorbing member can be formed from a combination of heat absorbing materials having differing heat capacity levels. The heat absorbing member can be formed as a series or block of bricks which are positioned with spacing therebetween to increase the exposed surface area of the bricks. The air fed into the chamber can be ambient air, which is injected into the block of bricks and moves through the spaces between the bricks so that the air quickly contacts the surface areas of the heated bricks and quickly heats up. The chamber and its contents are capable of storing heat energy for up to several months depending upon the rate of depletion and/or the amount of usage of the heat energy and the size of the storage/chamber.

The condensed solar energy beam can be supplied from a solar collecting system comprising a parabolic solar collector panel configured for reflecting solar rays to one of a focal point and a sub-focal point to at least partially condense the rays and at least one deflecting mirror mounted at either the focal point or the sub-focal point for receiving the condensed rays and redirecting the rays as a condensed solar energy beam to the enclosed chamber.

A heat sensor can be provided for monitoring the temperature level of the enclosed volume chamber. This heat sensor can be in communication with a power source for moving the at least one deflecting mirror from the focal point to interrupt the feed of the solar energy beam into the chamber at a given time and to control the amount of heat absorbed by the chamber. The amount of heat fed to the chamber can be depleted as needed such that the amount of heat absorbed by the chamber is maintained at a temperature which is below the melting point of the material forming the heat-absorbing member.

According to yet another aspect, the invention is directed to a system for providing sustainable thermal energy storage and a sustainable energy supply. The system comprises a first enclosed volume chamber associated with a first solar energy beam. The chamber has a mirrored inner surface configured for trapping heat within the chamber and for converting this heat into a high pressure source. A second enclosed volume chamber associated with a second solar energy beam and has a mirrored inner surface. The second enclosed volume chamber includes heat-absorbing material therein for storing heat energy. This second enclosed volume chamber can be associated with the first enclosed volume chamber for providing thermal energy into the first enclosed volume chamber. A plurality of second enclosed volume chambers can be associated with the first enclosed volume chamber for feeding a plurality of thermal energy sources therein, the sum of which results in an increased level of energy. Additionally, the first enclosed volume chamber can be associated with the second enclosed volume chamber in order to feed excess energy into this second enclosed volume chamber for storage thereof such that this stored energy may be used during times when the solar energy source (i.e., sun) is unavailable.

The first and second solar energy beams can be supplied from a first and a second solar collecting system wherein each of the first and second solar collecting systems comprise a parabolic solar collector panel configured for reflecting solar rays to one of a focal point and a sub-focal point to at least partially condense the rays and at least one deflecting mirror mounted at one of the focal point and sub-focal point for receiving the condensed rays and redirecting the rays as a condensed high-temperature solar energy beam to the enclosed chamber. A continuous charging of the energy chambers occurs, therefore, as the thermal energy of one of the chambers, such as the first chamber, becomes depleted, stored thermal energy from the second chambers can be fed into this first chamber while storing additional thermal energy into the second chamber when the sun is available.

A daily tracking system from east to west and seasonal tracking, as needed can be provided. The daily tracking system can include at least two cones mounted on a flat surface of the solar collecting system. The cones are positioned at slight diverging angles with respect to each other such that the collective collector panel axis of rotation at a perpendicular line in relation to the east-west axis at all times as the collector panel rotates. The purpose of the tracking system is to track the sun during the sunny hours as the sun cruises from east to west and maintain the sun rays perpendicular on the collective panel at all times. Seasonal manual adjustment of the collector panel (the whole system) for seasonal inclination along the north-south axis can be provided to further adjust the system due to seasonal inclination of the sun. Each of the cones includes a photocell located at the bottom of the cone. The cones can be placed, for example, on the upper surface of an arm of the solar collecting system extending in an east-west direction with respect to each other. The cones are placed in an upright position at a slightly tilting angle extending away from each other to insure that none of the sun's rays enter the cones at the same time. The east cone can be wired to an electric circuit such that it would be interrupted once the sunlight hits the photocell at the bottom of the east cone. The collector panel will then stop rotation and resume rotating once the sunlight is no longer shining into the cones as the sun moves to the west. The west cone can be wired to an electric circuit that would accelerate rotation of the collector panel once the sunlight hits the photocell in the bottom of the cone. The cones are placed in an upright position such that no shadow appears in the north or south at the cone base. Any shadow to the south of the cone base would indicate an inclination to the north and vice versa, and thus adjustment would be necessary. During the daily east-west tracking, the cones are placed on an arm of the solar collecting system along the east-west axis. These cones are diverted from each other at a narrow angle. The collector panel gear is set to rotate at a predetermined speed to approximately follow the speed of the sun as it cruises from east to west. The cones act as a control system to maintain the sunlight perpendicular on the collecting panel. Once the sun shines inside the east cone, such indicates that the collector panel is rotating too fast and the electric circuit is cut off to briefly stop the rotation of the collector panel until the rays no longer shine inside the cone. The collector panel then resumes rotation at the predetermined speed. Once the sun shines inside the west cone, such indicates that the collector panel is rotating slower than it should be and, thus, the speed of the collector panel is accelerated to make up this lag. When the sunlight is no longer shining inside the west cone, the predetermined speed of rotation is resumed. Since the sun tracking is set to work automatically and self-adjusts, any cloud interruption will not stop the collector panel rotation and once the clouds clear, readjustment is carried out automatically using the same principles set forth above. The seasonal tracking system includes providing a plurality of adjustable mounting legs, i.e., five legs, for supporting the solar collecting system. These legs are equipped with screws that can be manually twisted up and down on the north-south axis, i.e., lowering or elevating the entire system until the north or south shadow relative to the cones disappears, indicating no more inclination. Seasonal inclination is very slow and readjustment should take place every few weeks.

These and other features and characteristics of the present invention, as well as the methods of operation and functions of the related elements of structures, and the combination of parts and economies of manufacture will become more apparent upon consideration of the following description with reference to the accompanying drawings, all of which form a part of this specification, wherein like reference numerals designate corresponding parts in the various figures.

BRIEF DESCRIPTION OF THE DRAWINGS

FIG. 6 shows a perspective view of a solar collector panel wherein the deflecting mirror is mounted onto a retractable scope;

DETAILED DESCRIPTION OF THE INVENTION

Figure 1:
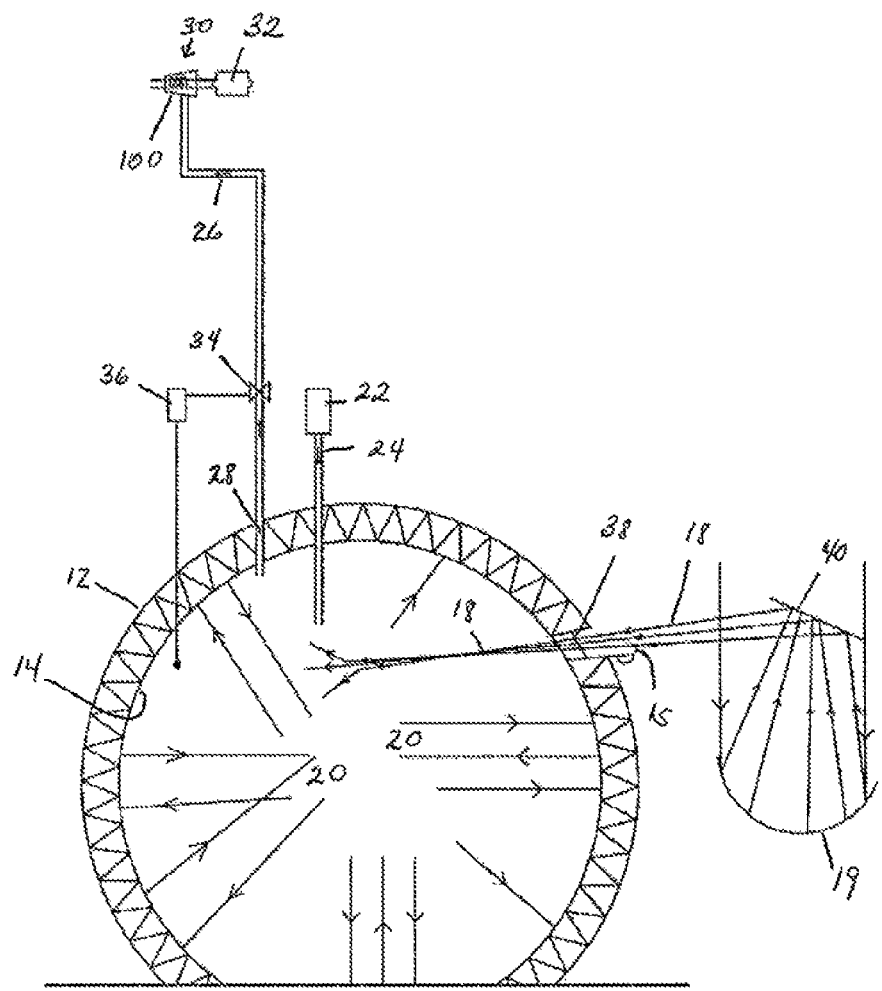
FIG. 1 shows a schematic side elevation view of an apparatus for converting solar energy into a mechanical and/or electrical energy product according to a first embodiment of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Reference is now made to FIG. 1 which shows a schematic side elevation view of an apparatus, generally indicated as 10, according to a first embodiment, for converting solar energy into a mechanical and/or electrical energy product. The apparatus 10 functions in a similar manner as a combustion engine, but in a much simpler fashion using a clean carbon-free fuel, i.e., distilled water or air. The apparatus 10 comprises an enclosed volume chamber 12 formed from a shell which can be made from poorly conductive material, i.e., ceramic, and can have a spherical or oval shape. The chamber 12 must be formed from a material capable of withstanding high pressures. The chamber 12 has an inner surface 14 which is lined with highly reflective mirrors, such as ceramic mirrors. The chamber 12 can include an opening 15 which extends through a wall 16 of the chamber for admitting a condensed high-temperature solar energy beam 18 fed from a parabolic solar collector panel 19 into the chamber 12. The mirrored inner surface 14 functions like a thermos to reflect and to at least temporarily trap heat therein created by a solar energy beam and as indicated by 20. At least a first fluid source 22 is provided for feeding a first fluid 24 into the chamber 12 wherein upon contact with the fluid 24, the trapped solar energy is converted into a high pressure source, as indicated by 26. An outlet 28 is provided for allowing the high pressure source to exit the chamber 12. A converting device, generally indicated as 30, is associated with the outlet 28 for converting the high pressure source 26 into the mechanical/electrical energy product. According to one embodiment, the converting device can comprise at least a first turbine 100 associated with the outlet for receiving the high pressure source 26.

Figure 7:
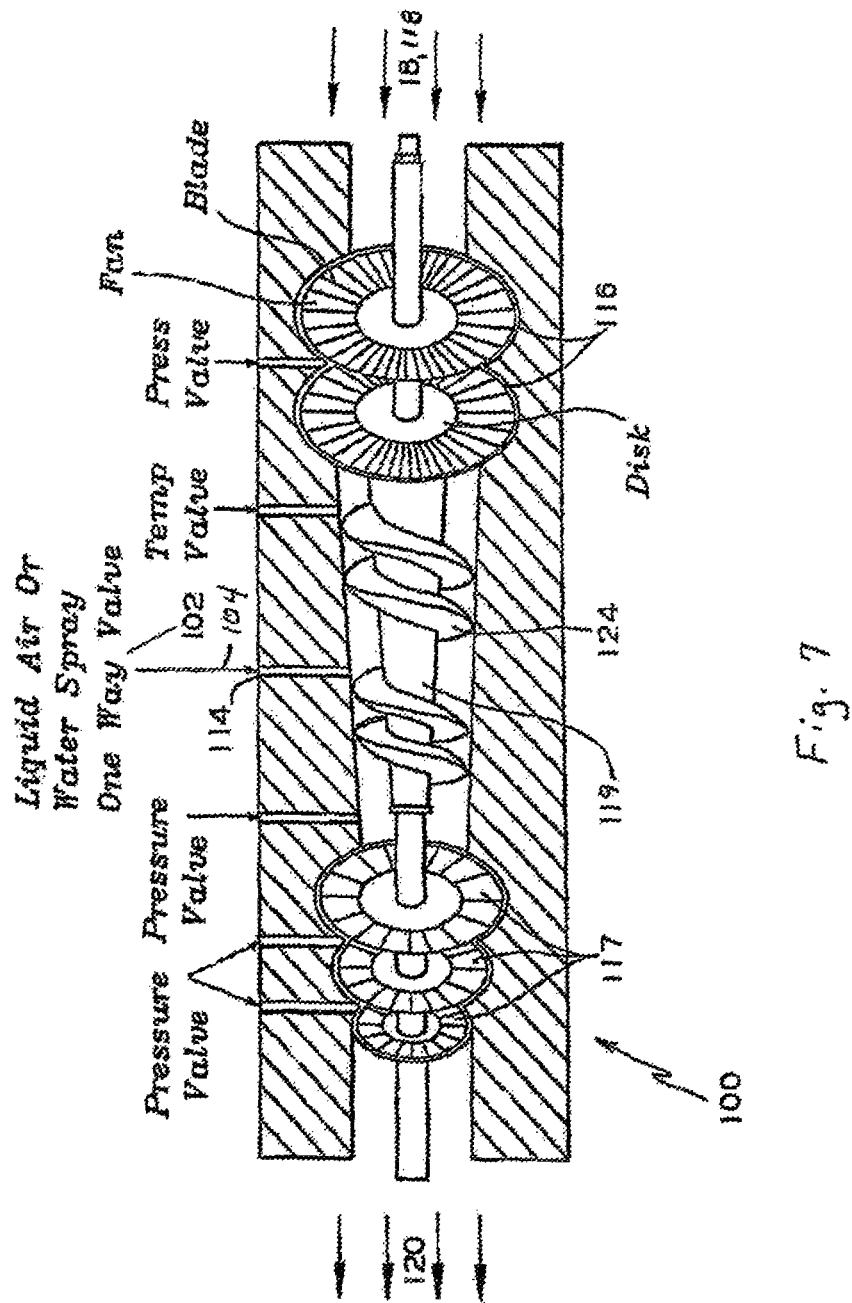
FIG. 7 shows a cross-sectional view of one type of turbine which can be powered by the converting apparatus/system of FIGS. 1-3.

Turbine 100 can be one of several designs, such as a one-stage turbine 100 as is shown in FIG. 7. Alternatively, the turbine can be a multiple-stage turbine. The turbine 100 can be connected to a generator 32 for converting the high pressure source into electrical energy. A plurality of turbines and/or a series of turbines can be associated with the outlet 28 for receiving high pressure sources 26 from the enclosed volume chamber 12. A second fluid source 102, such as shown in FIG. 7, can be provided for feeding a second fluid 104 into the first turbine 100 and/or by allowing ambient air, as illustrated by 118, to be sucked into the turbine 100 by the first set of blades/fans 116 such that any remaining or unused thermal energy contained therein can heat this second fluid 104 or ambient air so that this fluid can be recycled and converted into superheated steam or superheated air which can be subsequently fed to a second turbine (not shown) or to another chamber (not shown) of the first turbine 100 to produce even more energy. Additionally, the exhaust 120 emitted from any of the turbines 100 can be rich enough in thermal energy to power a second turbine (not shown). It also can be appreciated that converting device 30 can comprise a steam engine associated with the outlet for receiving the high pressure source.

It can be appreciated that the system of the present invention has numerous diverse applications and can be used in any application that requires high thermal energy including, but not limited to, waste gasification/management, melting of scrap metals, electricity generation, water desalination, and various other applications. Additionally, the invention allows one to increase the efficiency of the invention by recycling the thermal energy multiple times to increase the power output at no significant cost increase and at zero carbon emission. Further still, the cheap electricity produced would make it affordable to produce hydrogen gas as clean energy on a commercial scale using electrolysis and massive compressed air as back-up power.

Referring back to FIG. 1, a pressure valve 34 can be located before the outlet 28, such as between the outlet and the turbine 100, along with a control member, 36 for controlling opening and closing of the pressure valve 34 based upon a predetermined amount of pressure located within the chamber 12. According to one embodiment, the fluid can comprise water, such as distilled water, and the high pressure source 26 can comprise superheated steam. According to another embodiment, the fluid can comprise air, such as compressed ambient air, and the high pressure source 26 can comprise superheated air. Temperature and pressure sensors can be provided as a safety measure to interrupt the flow of energy to the chamber 12 in case of an emergency or in case a predetermined pressure or temperature is exceeded.

The opening 15 into the enclosed volume chamber can comprise a one-way mirror 38 on the north or the south side of the chamber to allow one-way entrance of the solar beam. Also, the enclosed volume chamber 12 is capable of trapping solar energy such that the heat trapped within the chamber reaches a temperature which is at a plasma level, which can exceed 4000° C., depending upon the size of the solar collector deflecting mirror 40, as shown in FIGS. 5A, 5B and 6, and how long the solar energy is trapped in the chamber 12 and the continuation of solar energy imputed into the chamber 12.

Figure 3:
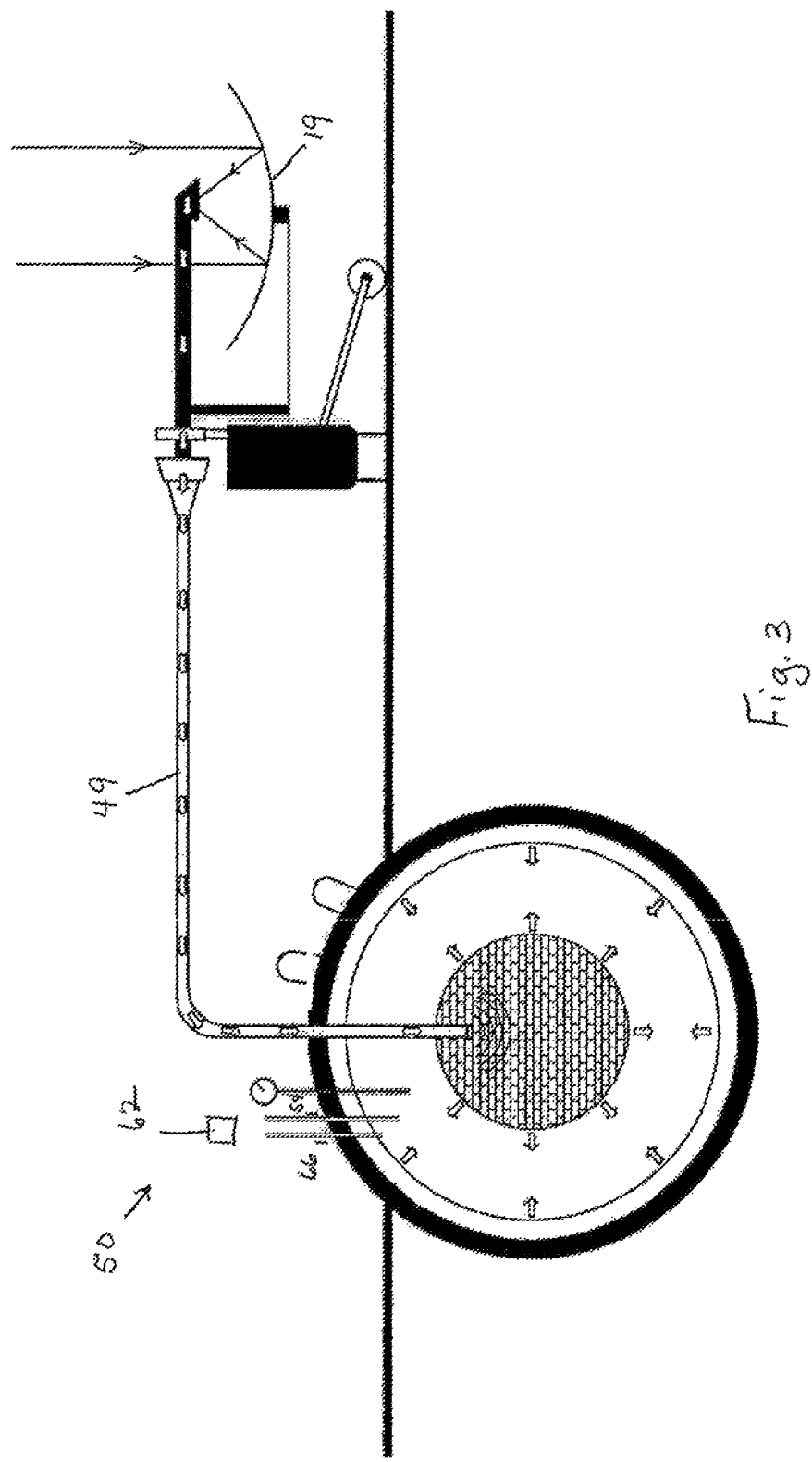
FIG. 3 shows a schematic side elevation view of the apparatus for storing and/or converting solar energy of FIG. 2, including a cable for transporting the thermal energy from the solar collector panel to the apparatus.
Figure 5A:
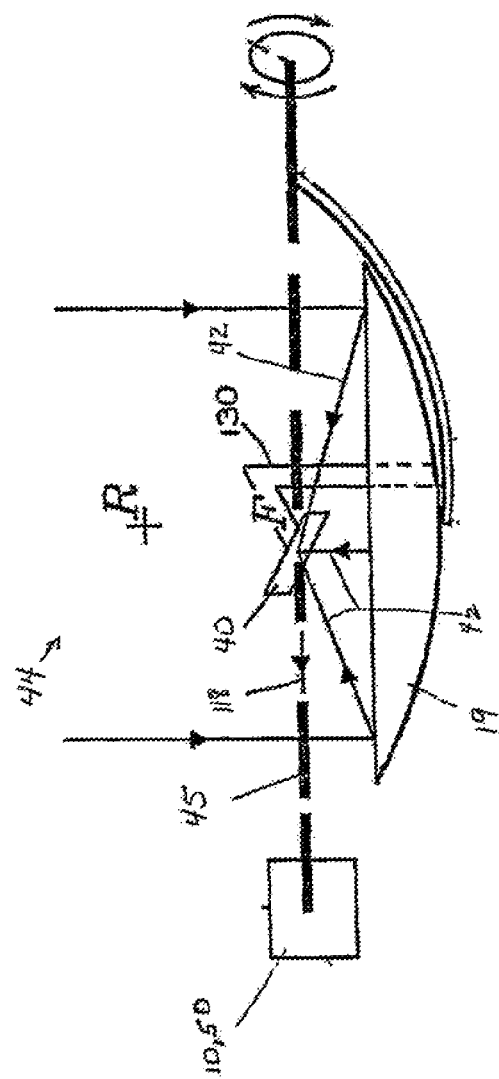
FIG. 5A shows a solar collector panel according to one design, having a fixed, stationary focal point, which can be used to supply solar energy to the apparatus/system of the present invention.
Figure 5B:
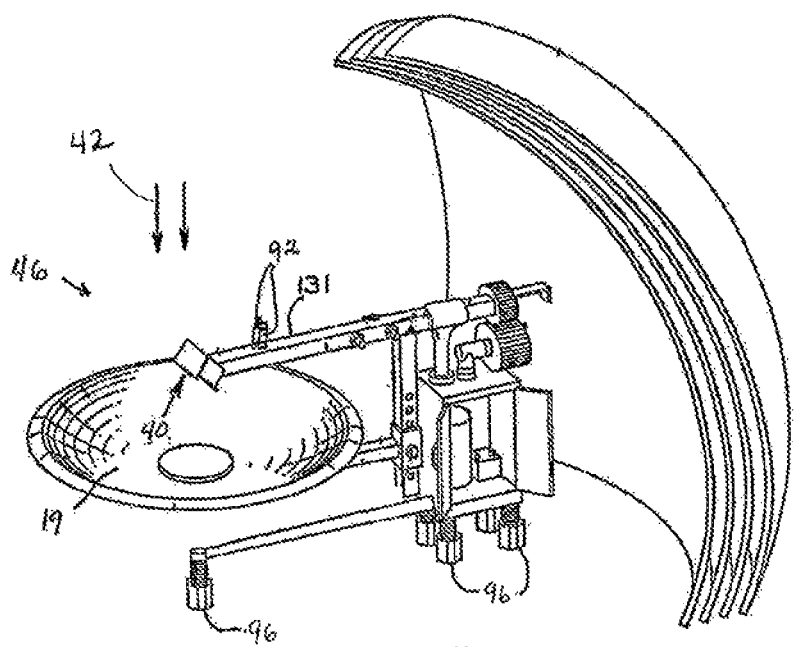
FIG. 5B shows a solar collector panel according to another design, having a fixed stationary focal point, which can be used to supply solar energy to the apparatus/system of the present invention.

Reference is now made to FIGS. 5A, 5B and 6, which show different parabolic solar collector devices, generally indicated as 44, 46 and 48 including a solar collecting panel 19, which can be used to supply the condensed high-temperature solar energy beam 18 into the enclosed volume chamber 12. The solar collector devices 44 and 46 of FIGS. 5A and 5B are described in detail in U.S. Pat. No. 7,640,931 to Tarabishi. The parabolic solar collector panel 19 is configured for reflecting solar rays 42 to either a stationary fixed focal point F or a stationary fixed sub-focal point. At least one deflecting mirror 40 is mounted via mounting arm 130, 131 at one of the focal point and sub-focal point for receiving the rays 42 and redirecting the rays 42 as the condensed high-temperature solar energy beam 18 moving along an imaginary axis 45 to the enclosed volume chamber 12. The solar energy beam 18 can be deflected directly into the enclosed volume chamber 10 from the deflecting mirror or, as shown in FIG. 3, it can be delivered by a cable 49. According to one embodiment, this cable 49 can be a fiber-optic cable. According to another embodiment, this cable 49 can be a cable having lumen having an inside wall which is lined with highly reflective material. It can be appreciated that any other well-known device can be used for delivering the condensed high-temperature solar energy beam 18 to the enclosed volume chamber 12.

Figure 2:
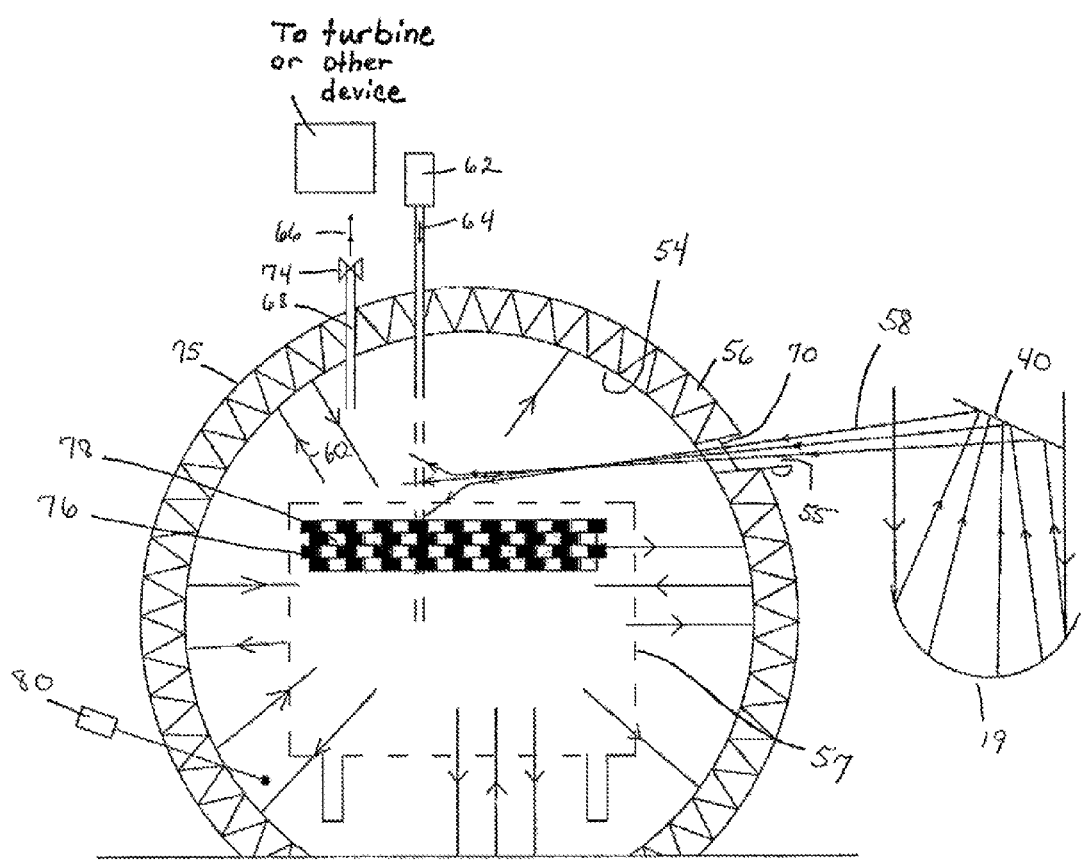
FIG. 2 shows a schematic side elevation view of an apparatus for storing and/or converting solar energy into a mechanical and/or electrical energy product according to a second embodiment of the present invention.

Reference is now made to FIG. 2 which shows an apparatus for storing and/or converting solar energy into a usable energy product, generally indicated as 50, according to another embodiment of the invention. This design is especially useful as a storing device for collecting and storing energy for use at times when solar energy from the sun is unavailable, such as during the night or during a cloudy day. This design differs from the design discussed above and shown in FIG. 1 in that the energy is stored and can be converted at a later time into a usable energy product, such as a mechanical or electrical energy product as discussed above. Alternatively, the stored energy can be fed to another converting apparatus, such as the type shown in FIG. 1 and discussed above. Additionally, any excess thermal energy not being stored within the apparatus 50 can be converted to a usable energy product at any time.

The apparatus 50 comprises a black body receiver or an enclosed volume chamber 52 having an outer shell 75 formed from a poorly-conductive material, such as ceramic. The chamber 52 must be formed from a material having sufficient strength to withstand high pressures. The inside surface of the enclosed volume chamber 52 can have a mirrored inside surface 54, such as formed from highly reflective ceramic mirrors, for reflecting and trapping heat, as indicated by 60. A heat absorbing member 57 is located within the chamber 52 and is capable of absorbing and storing at least a portion of the solar energy. An opening 55 extends through a wall 56 of the chamber 50 for allowing a condensed solar energy beam 58 to enter into the chamber 52 via a one-way mirror 70. A source 62 for feeding air, such as compressed ambient air 64, into the chamber 50 is provided such that upon contact with the solar heated heat absorbing member 57, this air becomes heated and is converted into a high pressure air source 66. An outlet 68 is provided for allowing the high pressure air source 66 to exit the chamber 52 and a pressure valve 74 is provided for cooperating with the outlet 68 for opening and closing based upon a predetermined amount of pressure located within the chamber 52. According to one embodiment, the high pressure air source 66 is capable of being fed to a turbine 100 connected to a generator 32, as discussed above in relation to FIG. 1, for converting the high pressure source into electrical energy. As stated above, the stored thermal energy is capable of being fed to a second enclosed volume chamber, such as the enclosed volume chamber 12, as shown in FIG. 1, to enable this second enclosed volume chamber 12 to increase and/or maintain a predetermined level of heat energy therein.

As stated above, the outer shell 75 of the chamber 52 can be formed from a poorly-conductive, insulated high pressure sustainable material. The heat absorbing member 57 can be formed from a combination of heat absorbing materials such as cast iron, magnesium, mixed ceramic material, and the like, having differing heat capacity levels and differing heat conductive properties. According to one design, the heat absorbing member 57 can be formed as a series or block of bricks 76 which are positioned with spacing 78 therebetween to increase the exposed surface area of the bricks 76. The air 64 fed into the chamber 50 can be ambient air, which is injected into the block 57 of bricks 76 and moves through the spaces 78 between the bricks so that the air 64 quickly contacts the surface areas of the solar heated bricks 76 and quickly heats up. The chamber 50 and its contents are capable of storing heat energy for up to several months depending upon the rate of depletion and/or the amount of usage of the heat energy and the size of the storage/chamber 50. This would be desirable in areas of the world where there are prolonged periods where sunlight is absent or there is very low sun intensity.

The condensed solar energy beam 58 can be supplied from a solar collecting system 44, 46 and/or 48, as shown in FIGS. 5A, 5B and 6, as discussed above. The solar collecting systems 44, 46, and 48 comprise a parabolic solar collector panel 19 configured for reflecting solar rays to one of a focal point and a sub-focal point to at least partially condense the rays and at least one deflecting mirror 40 mounted at either the focal point or the sub-focal point for receiving the condensed rays and redirecting the rays as a condensed solar energy beam 58 to the enclosed chamber 50.

With continuing reference to FIG. 2, a heat sensor 80 can be provided in the chamber 50 for monitoring the temperature level of the enclosed volume chamber 50. This heat sensor 80 can be in communication with a power source (not shown) for moving the at least one deflecting mirror 40 from the focal point to interrupt the feed of the solar energy beam 58 into the chamber 50 at a given time and to control the amount of heat absorbed by the chamber 50. Reference is made to FIG. 6 which shows the deflecting minor 40 mounted onto a retractable scope 82 which can be retracted, depending upon a sensed level of heat within the chamber 50 to move the deflecting mirror away from the focal point to reduce or interrupt delivery of solar energy into the chamber 50. The amount of heat fed to the chamber 50 can be depleted as needed and/or the amount of energy fed therein can be controlled by movement of the retractable scope 82 to interrupt the feed of solar energy into the chamber such that the amount of heat fed and/or absorbed by the heat absorbing member 57 within the chamber 50 is maintained at a temperature which is below the melting point of the material forming the heat absorbing member 57. The retractable scope 82 is configured to retract or remove the deflecting mirror 40 from the focal point or sub-focal point. This movement can be achieved manually or electronically in response to the heat sensors 80. The scope 82 can return the deflecting mirror 40 to its proper position once the chamber 50 has cooled to a predetermined temperature.

Figure 4:
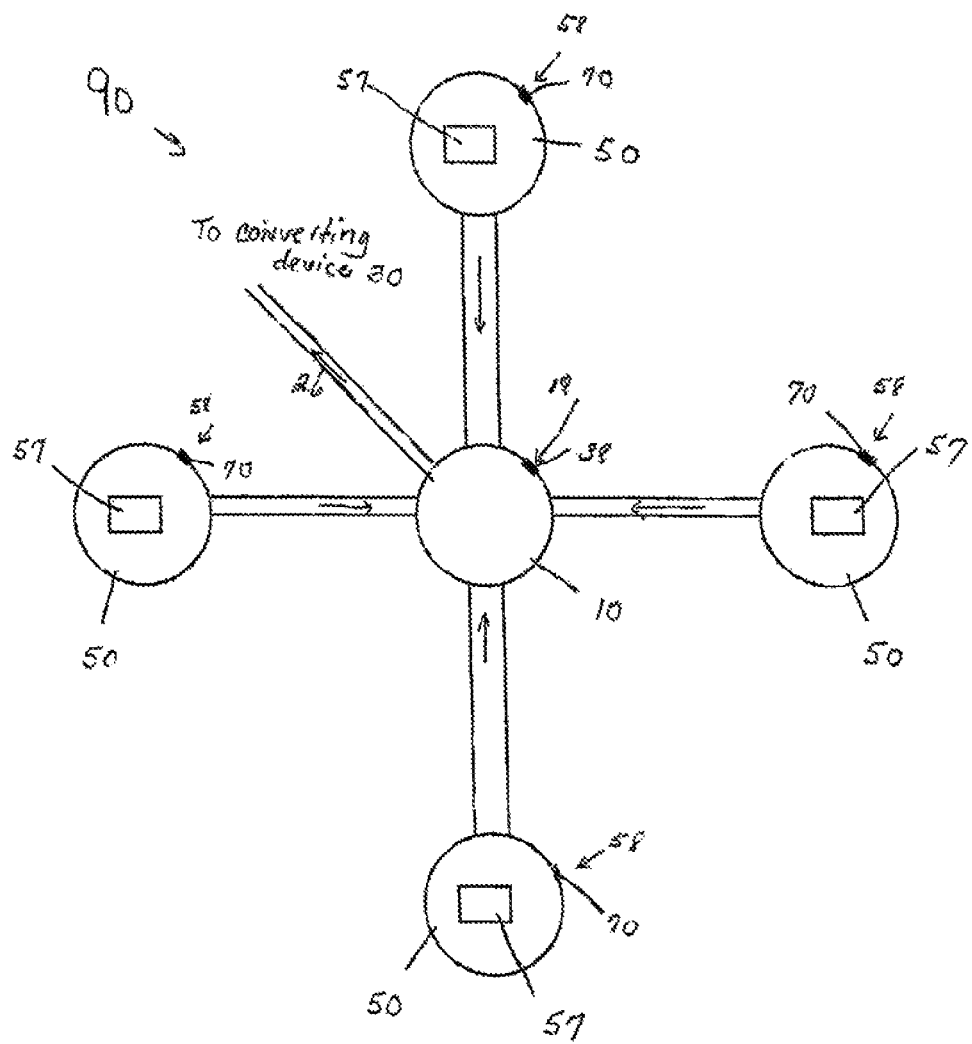
FIG. 4 shows a schematic representation of a sustainable thermal energy storage and a sustainable energy supply system according to the present invention.

Referring now to FIG. 4, there is shown a system, generally indicated as 90, for providing sustainable thermal energy storage and a sustainable energy supply. This first enclosed volume chamber 10 can have a larger size such that a greater amount of thermal energy can be received therein which will enormously increase the plasma temperature inside this chamber. The system 90 utilizes a combination of enclosed volume chambers, such as the enclosed volume chambers 10 and 50 disclosed above, wherein enclosed volume chamber 10, as shown in FIG. 1 is referred to as the first enclosed volume chamber and the enclosed volume chamber 50, as shown in FIG. 2, is referred to as the second enclosed volume chamber.

With continuing reference to FIG. 4, the system 90 comprises a first enclosed volume chamber 10, associated with a first solar energy beam 38 and having a mirrored inner surface 14 configured for trapping heat within the chamber 10 and for converting this heat into a high pressure source 28. The system 90 further includes at least one second enclosed volume chamber 50 associated with a second solar energy beam 58 and having a mirrored inner surface 54. The second enclosed volume chamber 50 includes heat-absorbing material 57 therein for storing heat energy. This second enclosed volume chamber 50 can be associated with the first enclosed volume chamber 10 for providing thermal energy via a high pressure source 66, into the first enclosed volume chamber 10. According to one embodiment, a plurality of second enclosed volume chambers 50 can be associated with the first enclosed volume chamber 10 for feeding a plurality of thermal energy sources 66 therein, the sum of which results in an increased level of energy within the first enclosed volume chamber 10. Additionally, the first enclosed volume chamber 10 can be associated with the second enclosed volume chamber or chambers 50 in order to feed excess energy into the second enclosed volume chamber or chambers 50 for storage thereof such that this stored energy may be used during times when the solar energy source (i.e., sun) is unavailable.

The first and second solar energy beams 18, 58 can be supplied from a first and a second solar collecting system, such as those shown in FIGS. 5A, 5B and/or 6, and discussed in detail above, wherein each of the first and second solar collecting systems 44, 46, 48 comprise a parabolic solar collector panel 19 configured for reflecting solar rays to one of a fixed stationary focal point and a fixed stationary sub-focal point to at least partially condense the rays. At least one deflecting mirror 40 is mounted at one of the focal point and sub-focal point for receiving the condensed rays and redirecting the rays as the condensed high-temperature solar energy beam 18, 58 to the enclosed chambers 10, 50. A continuous charging of the energy chambers 10, 50 occurs. Therefore, as the thermal energy of one of the chambers, such as the first chamber 10, becomes depleted, stored thermal energy from the second chambers 50 can be fed into this first chamber 10, while storing additional thermal energy into the second chamber or chambers 50 when the sun is available. During the sunny hours, this system 90 can be reversed so that some of the energy is used instantly and some of the energy received in the first enclosed volume chamber 10 can be fed to the series of second enclosed volume chambers 50 to recharge the thermal energy storage units 57 contained within the second enclosed volume chambers 50.

According to one embodiment, the same solar collecting system 44, 46, 48 can supply both the first and second enclosed volume chambers 10, 50, such as with a split mirror. In this design, the energy supplied is weaker and, therefore, must be retained in the chamber 10, 50 longer to reach a predetermined energy level. Additionally, the input of fluid 24, 64 can be pulsated in increments, which would delay the consumption of the energy and allow the energy level to increase within the chambers 10, 50 because the period of time between the pulses will delay depletion for a short time while retaining energy. The incremental pulsations can be modified as needed to increase the period of time between pulses and to further delay depletion as necessary until a predetermined level of energy within the chamber or chambers 10, 50 is obtained.

It can be appreciated that the system for providing sustainable thermal energy storage and a sustainable energy supply is not limited to any particular number of chambers 10, 50 or any combination of chambers 10, 50 used for forming the system.

Figure 5C:
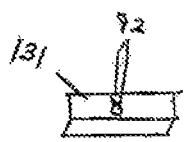
FIG. 5C shows a top view of a portion of the panel arm including the tracking cones of the invention.
Figure 5D:
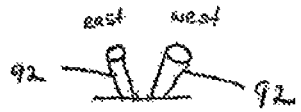
FIG. 5D shows a front view of the cones of FIG. 5C.

Reference is now made to FIGS. 5B-5D which shows a daily east-to-west tracking system that can be used to control the rotation of the solar collecting panel 19. The daily tracking system includes at least two cones 92 mounted on a flat surface of the solar collecting system 46. The cones 92 are positioned at slight diverging angles with respect to each other such that the collective panel axis of rotation at a perpendicular line in relation to the east-west axis at all times as the collecting panel 19 rotates. The purpose of the tracking system is to track the sun during the sunny hours as the sun cruises from east to west and maintain the sun rays perpendicular on the collective panel at all times. Seasonal manual adjustment of the collector panel (the whole system) for seasonal inclination along the north-south axis can be provided to further adjust the system due to seasonal inclination of the sun. Each of the cones includes a photocell located at the bottom of the cone. The cones 92 can be placed, for example, on the upper surface of an arm 131 of the solar collecting system extending in an east-west direction with respect to each other. The cones 92 are placed in an upright position at a slightly tilted angle extending away from each other to insure that none of the sun's rays enter the cones at the same time. The east cone can be wired to an electric circuit such that it would be interrupted once the sunlight hits the photocell at the bottom of the east cone. The collecting panel 19 will then stop rotation and then resume rotating once the sunlight is no longer shining into the cones 92 as the sun moves to the west. The west cone can be wired to an electric circuit that would accelerate rotation of the collecting panel 19 once the sunlight hits the photocell in the bottom of the cone. The cones are placed in an upright position such that no shadow appears in the north or south at the cone base. Any shadow to the south of the cone base would indicate an inclination to the north and vice verse, and thus adjustment would be necessary. During the daily east-west tracking, the cones 92 are placed on an arm 131 of the solar collecting system 46 along the east-west axis. These cones 92 are diverted from each other at a narrow angle. The collector panel gear is set to rotate at a predetermined speed to approximately following the speed of the sun as it cruises from east to west. The cones 92 act as a control system to maintain the sunlight perpendicular on the collecting panel 19. Once the sun shines inside the east cone, such indicates that the collector panel 19 is rotating too fast and the electric circuit is cut off to briefly stop the rotation of the collector panel until the rays no longer shine inside the cone. The collector panel then resumes rotation at the predetermined speed. Once the sun shines inside the west cone, such indicates that the collector panel is rotating slower than it should be and thus, the speed of the collector panel is accelerated to makeup this lag. When the sunlight is no longer shining inside the west cone, the predetermined speed of rotation is resumed. Since the sun tracking is set to work automatically and self-adjusts, any cloud interruption will not stop the collector panel rotation and once the clouds clear, readjustment is carried out automatically using the same principals set forth above. The seasonal tracking system includes providing a plurality of adjustable mounting legs 96, i.e., five legs, for supporting the solar collecting system 46. These legs are equipped with screws that can be manually twisted up and down on the north-south axis, i.e., lowering or elevating the entire system until the north or south shadow relative to the cones disappears, indicating no more inclination. Seasonal inclination is very slow and readjustment should take place every few weeks.

FIG. 7 shows one type of turbine, generally indicated as 100 which can be powered by either of the converting apparatuses shown in FIG. 1 or FIG. 2 and/or by the sustainable system of FIG. 4. The heated pressurized air 18 from the enclosed volume chamber 12, 52 enters into the turbine 100 to cause the fans/plates 116, 117 to rotate. The force of the pressure within the turbine 100 decreases as it moves through the turbine from the first set of fans/plates 116 to the second set of fans/plates 117. The maintenance of the pressure within the turbine 100 is controlled by a series of safety gauges, feeding gauges, pressure relief valves and temperature sensors. The force of the pressure differential within the turbine 100 causes the fans/plates 116, 117 to rotate in a single direction which consequently causes the shaft 119 to rotate. This rotational energy can then be converted into electrical energy by a connection to a generator or any other well-known means. Additional rotating members 124 can be provided which contact the inside surface of the turbine 100 to provide additional rotational force and control of the movement of the air as well as provide additional stability to the shaft 119.

With continuing reference to FIG. 6, a fluid/medium source 102, such as liquid/compressed air or distilled water, can be provided into the turbine 100 via a one-way valve 114, so that any thermal energy contained in the turbine 100 is converted into superheated steam or superheated air which can be subsequently fed to a second turbine or to another chamber of the turbine. Additionally, the exhaust emitted from any of the turbines can be rich enough in thermal energy to power a second turbine. According to another embodiment, the converting device can comprise a steam engine (not shown) associated with the turbine outlet for receiving the high pressure source.

It can be appreciated that the turbine shown in FIG. 6 is only one type of turbine which can be used and that various types of turbines, such as single chamber, multiple chamber, and the like, and various types of other types of mechanical energy devices can be powered by the converting apparatuses and/or by the sustainable system of the present invention.

Accordingly, the present invention is a clean energy, economically feasible, system that is simple in design and operation, is self-sustainable, and features a central mechanism that is capable of a steadily high percentage of collection of available solar energy. Additionally, the invention is easy to maintain, capable of condensing solar energy onto a focal point that is continuously fixed as a stationary location, i.e., perfect focal point, which can be deflected to a receiver that can convert thermal energy to provide energy for numerous applications. Further still, the invention provides a sun-tracking system that maintains the sun's rays perpendicular on the collecting surface throughout the sunny hours; provides an efficient and effective thermal energy storage system that is capable of providing a steady energy source to meet basic energy demand during the sunless hours for many days; has the capability to integrate and co-generate with other sources of green energy in multi-hybrid arrangements having expandable features; and has a desirable level of efficiency (almost 100% or more) which is obtainable through the used smaller space requirements.

Basic Multiple Hybrid System for Sustainable Energy

Figure 8:
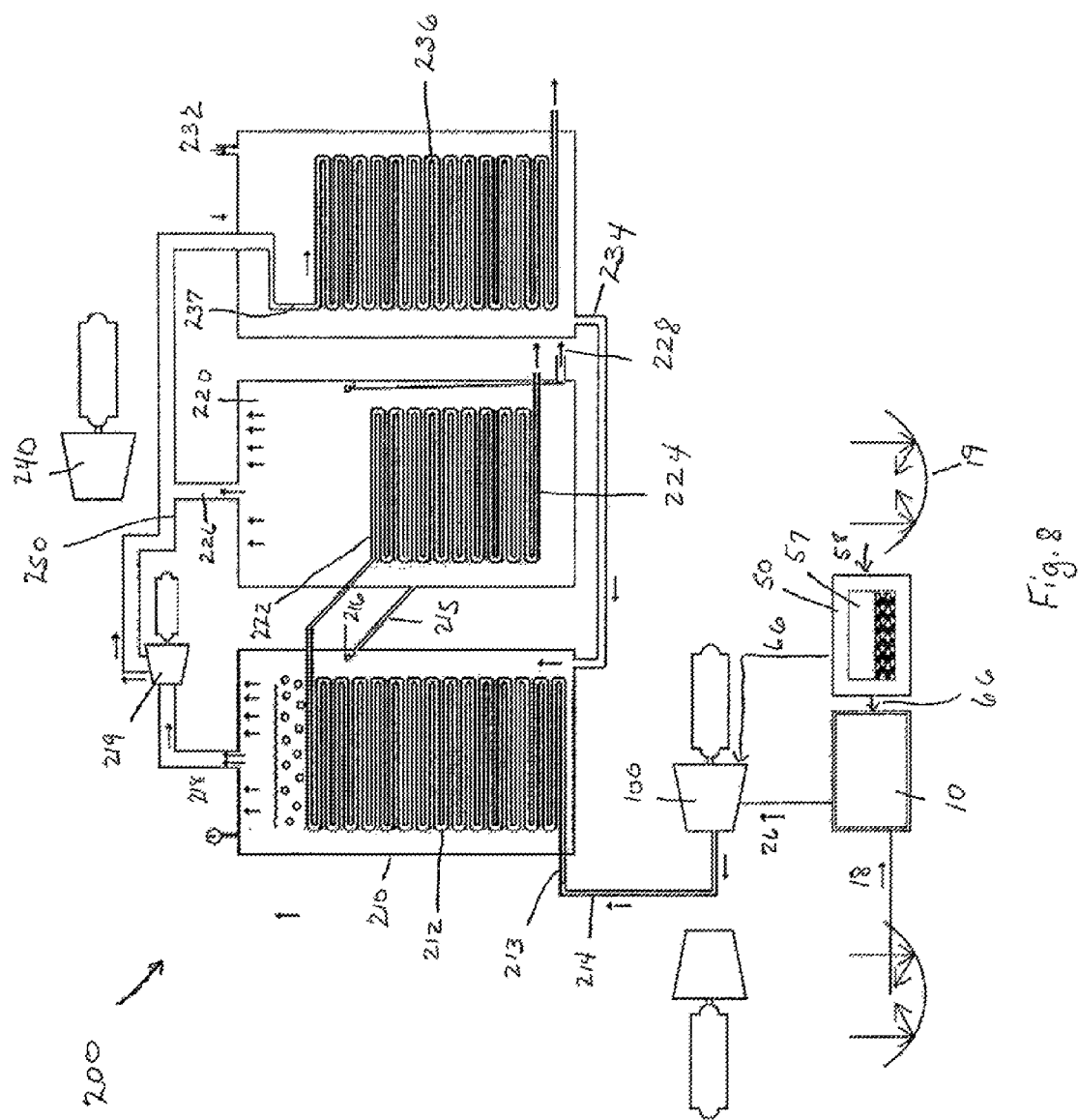
FIG. 8 shows a schematic representation of a desalination system that can be powered by the present invention.

Reference is now made to FIG. 8 which shows a schematic representation of a desalination system, generally indicated as 200, which can utilize the energy conversion system of the present invention. It can be appreciated that this desalination system 200 is one of many applications which can utilize the present invention.
Phase One
The revolutionary solar collector system, as described in U.S. Pat. No. 7,640,931 to Tarabishi, is a standard component of the ultimate green energy system. The desalination system 200, shown in FIG. 8, obtains solar energy from the solar collecting system of the '931 patent and uses this solar energy in the energy conversion system of the present invention as described below.
During the Sunny Hours
A first enclosed volume chamber 10 receives the condensed solar energy supply 18 into the enclosed volume chamber 10. At the same time, a fluid source 24 under pressure, such as a distilled water spray, is supplied through the top third of the chamber to instantly generate steam of tremendous pressure that will be allowed to exit as a high pressure energy source 26 and into a turbine 100 that in turn will force the turbine blades and shaft within the turbine 100 to rotate. Instead of the distilled water spray, it is possible to use ambient air or compressed which can be injected shell cavity. Once the very hot air is passed to the turbine 100, the turbine performance would be enhanced by allowing again ambient air (get sucked in by a first set of blades 116) or compressed air 104 fed into the chamber, expansion of which shall increase pressure further and enhance performance. This enhanced turbine performance is discussed above in relation to FIG. 7.

A second enclosed volume chamber 50 can be provided for receiving a supply of condensed solar energy into the shell cavity as usual. The black body/storing member 57 gets charged with thermal energy steadily, while part of the thermal energy in the chamber is free for immediate use. Ambient or compressed air is injected into the chamber 50, resulting in the production of very hot or superheated air 66 that gets retrieved to supply the turbine 100, wherein the turbine's performance can be enhanced by the application of fresh ambient air or a spray of water to generate a high pressure that forces the turbine blades 116, 117 and shaft 119 to rotate. During the sunless hours, the ambient air is injected into the cavity to circulate between the hot bricks and gets loaded with thermal energy which can later be converted into a high pressure source 66 and fed into the first chamber 10.
Phase Two
The turbine exhaust or waste heat, whether dry or moist, is rich with thermal energy. The exhaust shall be recycled in a multi-hybrid system to generate more electricity and desalinated water using recycled energy in multiple steps as follows. Basically, the multi-hybrid system consists of two or more tanks to generate steam, and one or more tanks to condense steam.
Tank One Steam Generator
A first tank 210 gets filled with ocean water to a level of about ¾ths. At the level of about ⅔rds, an opening 215 on the side of the tank 210 acts as an exit for the overflow. The opening is closed with a valve and controlled with siphon 216 that allows the overflow only if the water level gets above the level of the ¾ths of the tank 210. The upper ¼th of the space of the tank 210 holds the steam generated under pressure to exit for turbine operation, as shown by 218, 219.

The first tank 210 has metallic coil tubes 212 engaged in the ocean water contained within the tank 210. The lower end 213 of the metallic coils 212 is connected to the turbine exhaust exit 214. The upper end of the metallic coils crosses to a second tank 220 and steam is generated to an upper end 222 of coils 224 in a similar manner as with to the coils 212 of the first tank 210. The crossover through both tanks 210, 220 is carried out under a sealed condition.
Tank One Cycle
The turbine hot exhaust, which is at a level of several hundreds centigrade, enters the lower end 213 of the metallic coils 212 and circulates through the coil lumen. The exhaust temperature is higher than the surrounding ocean water so that a heat exchange takes place and thermal energy is transferred to the surrounding ocean water in the boiler tank 210. The feeding water from a condensation tank 230 is already preheated by the latent heat released during condensation. The first tank 210 filled with ocean water shall rise to the boiling point and, as steam is generated and accumulated under pressure in the upper ¼th of the tank space, this steam can exit at 218 to operate a new turbine 219. The exhaust of the new turbine 219 can be used by a third turbine 240 with the help of additional steam generated by the second tank 220.
Tank Two Steam Generator
Metallic coils 224 similar to those used in the first tank 210 are placed in a second tank 220. This second tank 220 is filled by the overflow of hot water from the first tank 210. The exhaust still circulating in the metallic coils 224 of the second tank 220, the temperature of which is still higher than the surrounding overflow water, causes a heat exchange to take place and thermal energy gets transferred to the overflow water, which is already close to the boiling point. Further evaporation takes place and steam is generated that escapes through the opening 226 in the top of the second tank 220 connected to a common pipe 250 coming from the first tank 210. This common pipe 250 shall carry steam under pressure to operate a new turbine.

At the bottom of the second tank 220, the leftover hot salted water would exit at 228 and can be used through a multi-effect desalination process (MED) to generate an additional amount of desalinated water.

Tank Three Steam Condensation

A third tank 230 gets filled with fresh sea water from the top opening 232 and is drained from the bottom 234 to feed the first tank 210. The third tank 230 also has metallic coils 236 that are connected at the top portion 237 to the common pipe 250 which carries steam as exhaust. The hot metallic coils 236 shall transfer thermal energy to surrounding ocean water and get preheated by the latent energy released. The steam gets condensed and exits at the lower end 238 of the coils 236 as desalinated water.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the invention. For example, it is to be understood that the present invention contemplates that, to the extent possible, one or more features of any embodiment can be combined with one or more features of any other embodiment.

The invention claimed is:

1. An apparatus for converting solar energy into a mechanical and electrical energy product, said apparatus comprising:
    an enclosed volume chamber having a mirrored inner surface;
    an opening extending through a wall of the chamber for admitting a condensed high-temperature solar energy beam into said chamber, said chamber having the mirrored inner surface being configured for reflecting the solar energy beam about the chamber and preventing the solar energy beam from being located at a single point in the chamber, trapping heat therein created by said solar energy beam;
    at least a first fluid source for feeding a first fluid into said chamber wherein upon contact with said fluid, said trapped solar energy is converted into a high pressure source;
    an outlet for allowing said high pressure source to exit said chamber; and
    at least one turbine for converting said high pressure source into the mechanical and electrical energy product;
    wherein the heat trapped within the chamber can reach a temperature as high as a plasma level; and
    wherein the mirrored inner surface is comprised of ceramic material.

2. The apparatus of claim 1 wherein the at least one turbine comprises at least a first turbine associated with said outlet for receiving said high pressure source.

3. The apparatus of claim 2 wherein said at least one turbine is connected to a generator for converting said high pressure source into electrical energy.

4. The apparatus of claim 2 comprising a steam engine associated with said outlet for receiving said high pressure source.

5. The apparatus of claim 1 including a pressure valve located between said outlet and said turbine and a control member for controlling opening and closing of said valve based upon a predetermined amount of pressure located within said chamber.

6. The apparatus of claim 1 wherein the fluid comprises water and said high pressure source comprises superheated steam.

7. The apparatus of claim 1 wherein the fluid comprises air and said high pressure source comprises superheated air.

8. The apparatus of claim 1 wherein said opening comprises a one-way mirror.

9. The apparatus of claim 1 wherein the condensed high-temperature solar energy beam is supplied from a solar collecting system comprising a parabolic solar collector panel configured for reflecting solar rays to one of a focal point and a sub-focal point to at least partially condense said rays and at least one deflecting mirror mounted at one of said focal point and sub-focal point for receiving said condensed rays and redirecting said rays as a condensed high-temperature solar energy beam to said enclosed volume chamber.

10. The apparatus of claim 9 including at least one of a fiber optic cable and a cable having a lumen with an inner surface lined with reflective material for delivering said solar energy beam to said enclosed chamber.

11. The apparatus of claim 2 including a second fluid source for feeding a second fluid into the first turbine such that any thermal energy contained therein is converted into superheated steam or superheated air which can be subsequently fed to a second turbine or to another chamber of the first turbine.

12. The apparatus of claim 1 wherein said enclosed chamber includes one or more inlet ports for receiving heat energy from an enclosed volume solar powered heat absorbing receiver for sustaining a predetermined level of heat energy therein.

13. An apparatus for storing and converting solar energy into a mechanical and electrical energy product, said apparatus comprising:
    an enclosed volume chamber having a mirrored inner surface said chamber having the mirrored inner surface being configured for reflecting the solar energy beam about the chamber and preventing the solar energy beam from being located at a single point in the chamber, trapping heat therein created by said solar energy beam;
    a heat absorbing member located within said chamber, said heat absorbing member being capable of absorbing and storing at least a portion of said solar energy;
    an opening extending through a wall of the chamber for allowing a condensed solar energy beam to enter into said chamber;
    a source for feeding air into said chamber wherein upon contact with said heat absorbing member, said ambient is heated and converted into a high pressure air source;
    an outlet for allowing said high pressure air source to exit said chamber;
    a pressure valve for cooperating with said outlet, said pressure valve capable of opening and closing based upon a predetermined amount of pressure located within said chamber; and
    wherein the heat trapped within the chamber can reach a temperature as high as a plasma level; and
    wherein the mirrored inner surface is comprised of ceramic material.

14. The apparatus of claim 13 wherein said high pressure air source is capable of being fed to a turbine connected to a generator for converting said high pressure source into electrical energy.

15. The apparatus of claim 13 wherein said stored thermal energy is capable of being fed to another enclosed volume chamber to enable said other enclosed volume chamber to increase and/or maintain a predetermined level of heat energy in said second chamber.

16. The apparatus of claim 13 wherein the outer surface of the chamber is formed from a poorly conductive, high pressure sustainable material.

17. The apparatus of claim 13 wherein the heat absorbing member is formed from a combination of heat absorbing materials having differing heat capacity levels.

18. The apparatus of claim 13 wherein the chamber is capable of storing heat energy for up to several months, depending upon the rate of depletion and/or the amount of usage of the heat energy.

19. The apparatus of claim 13 wherein the condensed solar energy beam is supplied from a solar collecting system comprising a parabolic solar collector panel configured for reflecting solar rays to one of a focal point and a sub-focal point to at least partially condense said rays and at least one deflecting mirror mounted at one of said focal point and sub-focal point for receiving said condensed rays and redirecting said rays as a condensed solar energy beam to said enclosed chamber.

20. The apparatus of claim 19 including a heat sensor for monitoring the temperature level of the enclosed volume chamber, said heat sensor being in communication with a power source for moving the at least one deflecting mirror from the focal point to interrupt the feed of the solar energy beam into the chamber at a given time and to control the amount of heat absorbed by the chamber.

21. The apparatus of claim 20 wherein the amount of heat fed to the chamber is depleted as needed such that the amount of heat absorbed by the chamber is maintained at a temperature that is below the melting point of the material forming the heat absorbing member.

22. A system for providing sustainable thermal energy storage and a sustainable energy supply, said system comprising:

A first enclosed volume chamber associated with a first solar energy beam and having a mirrored inner surface configured for reflecting the solar energy beam about the chamber and preventing the solar energy beam from being located at a single point in the chamber, trapping heat within said chamber and for converting this heat into a high pressure source;

A second enclosed volume chamber associated with a second solar energy beam and having a mirrored inner surface, said second enclosed volume chamber including heat-absorbing material therein for storing heat energy, said second enclosed volume chamber being associated with the first enclosed volume chamber for providing thermal energy into the first enclosed volume chamber;

wherein the heat trapped within the first enclosed volume chamber can reach a temperature as high as a plasma level; and wherein the mirrored inner surface is comprised of ceramic material.

23. The system of claim 22 wherein a plurality of second enclosed volume chambers is associated with said first enclosed volume chamber for feeding a plurality of thermal energy sources therein.

24. The system of claim 22 wherein the first enclosed volume chamber is associated with the second enclosed volume chamber for feeding excess thermal energy therein for storage.

25. The system of claim 22 wherein the first and second solar energy beams are supplied from a first and a second solar collecting system wherein each of said first and second solar collecting systems comprises a parabolic solar collector panel configured for reflecting solar rays to one of a focal point and a sub-focal point to at least partially condense said rays and at least one deflecting mirror mounted at one of said focal point and sub-focal point for receiving said condensed rays and redirecting said rays as a condensed high-temperature solar energy beam to said enclosed chamber.

26. The system of claim 22 including a daily tracking system comprising at least two cones mounted on the solar collecting system, each of said cones including a photocell at a bottom portion thereof, said photocells including a signaling member associated with a motor for rotating the solar collection system at a predetermined speed wherein the speed of rotation is adjusted based upon the sun's contact with the photocells to ensure perpendicular positioning of the sun with respect to the collecting panel.

* * * * *

UNITED STATES PATENT AND TRADEMARK OFFICE
CERTIFICATE OF CORRECTION

PATENT NO. : 8,413,442 B2
APPLICATION NO. : 12/889570
DATED : April 9, 2013
INVENTOR(S) : M. Hisham Tarabishi Page 1 of 1

It is certified that error appears in the above-identified patent and that said Letters Patent is hereby corrected as shown below:

In the Claims

Column 16, Lines 50-51, Claim 13, delete "ambient is heated" and insert -- ambient air is heated --

Column 16, Line 53, Claim 13, delete "chamber;" and insert -- chamber; and --

Column 17, Line 39, Claim 22, delete "A first" and insert -- a first --

Column 18, Line 2, Claim 22, delete "source;" and insert -- source; and --

Column 18, Line 3, Claim 22, delete "A second" and insert -- a second --

Signed and Sealed this
Thirtieth Day of July, 2013

Teresa Stanek Rea
*Acting Director of the United States Patent and Trademark Office*